US012683637B2

(12) United States Patent
Wu et al.

(10) Patent No.: US 12,683,637 B2
(45) Date of Patent: Jul. 14, 2026

(54) COMMUNICATION DEVICE AND COMMUNICATION METHOD

(71) Applicant: HTC Corporation, Taoyuan City (TW)

(72) Inventors: Chun-Yih Wu, Taoyuan City (TW);
Ta-Chun Pu, Taoyuan City (TW);
Yen-Liang Kuo, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 279 days.

(21) Appl. No.: 18/666,269

(22) Filed: May 16, 2024

(65) Prior Publication Data

US 2025/0300685 A1      Sep. 25, 2025

(30) Foreign Application Priority Data

Mar. 19, 2024     (TW) ................................. 113110079

(51) Int. Cl.
H04B 1/04          (2006.01)
H01Q 21/28        (2006.01)
H01Q 1/24          (2006.01)

(52) U.S. Cl.
CPC ........... H04B 1/0483 (2013.01); H01Q 21/28 (2013.01); H01Q 1/248 (2013.01)

(58) Field of Classification Search
CPC ...... H04B 1/0483; H04B 13/005; H04B 1/18; H04B 1/3838; H01Q 21/28; H01Q 1/248
See application file for complete search history.

(56) References Cited

U.S. PATENT DOCUMENTS 9,876,276 B2 *  1/2018  Bengtsson ........... H01Q 9/0407
2019/0312361 A1 * 10/2019 Nakanishi ............ H04B 1/3838
2021/0314011 A1 * 10/2021 Kang ....................... H04B 5/77

FOREIGN PATENT DOCUMENTS

KR          100966254 B1  *  6/2010

* cited by examiner

*Primary Examiner* — Curtis A Kuntz
(74) *Attorney, Agent, or Firm* — Birch, Stewart, Kolasch & Birch, LLP

(57)          ABSTRACT

A communication device includes a frequency boost module, an antenna element, an electrode element, and a baseband signal processor. The antenna element is coupled to the frequency boost module. The baseband signal processor includes a signal generator, a controller, and a switch element. The signal generator generates an RF (Radio Frequency) signal. The signal generator has a first transmission path, a second transmission path, and a third transmission path. The first transmission path is coupled to the frequency boost module. The third transmission path is coupled to the electrode element. The controller generates a control signal. The switch element selectively couples the second transmission path to the frequency boost module or the electrode element according to the control signal.

20 Claims, 3 Drawing Sheets

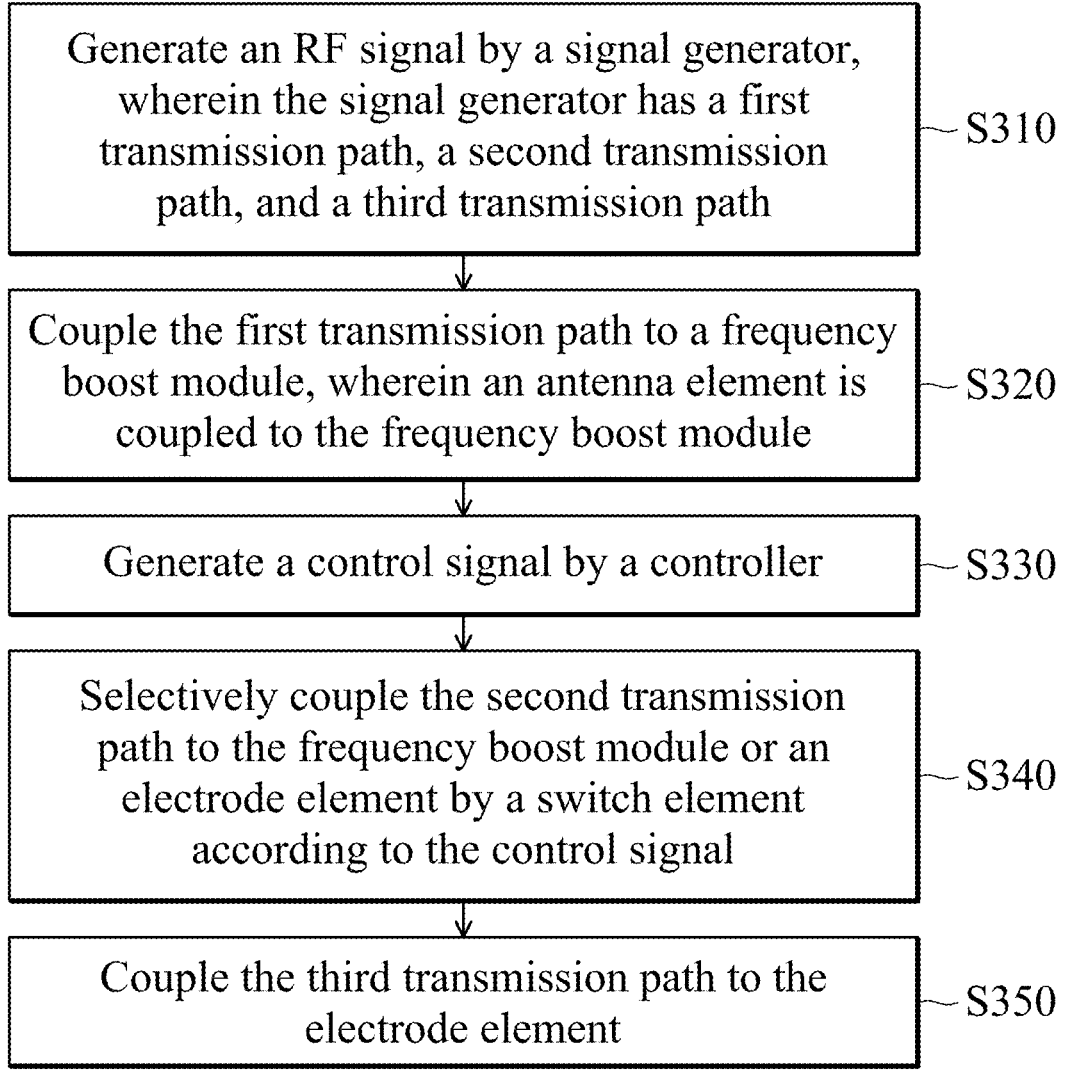

Generate an RF signal by a signal generator, wherein the signal generator has a first transmission path, a second transmission path, and a third transmission path ⟶ S310

Couple the first transmission path to a frequency boost module, wherein an antenna element is coupled to the frequency boost module ⟶ S320

Generate a control signal by a controller ⟶ S330

Selectively couple the second transmission path to the frequency boost module or an electrode element by a switch element according to the control signal ⟶ S340

Couple the third transmission path to the electrode element ⟶ S350

FIG. 3

COMMUNICATION DEVICE AND COMMUNICATION METHOD

CROSS REFERENCE TO RELATED APPLICATIONS

This application claims priority of Taiwan Patent Application No. 113110079 filed on Mar. 19, 2024, the entirety of which is incorporated by reference herein.

BACKGROUND OF THE INVENTION

Field of the Invention

The invention relates to a communication device, and more particularly, to a communication device and a communication method.

Description of the Related Art

In the fields of VR (Virtual Reality) and AR (Augmented Reality), devices are usually connected to other devices in a wired or wireless way. However, in general these connections tend to have problems with communication quality. Accordingly, there is a need to propose a novel solution for solving the problems of the prior art.

BRIEF SUMMARY OF THE INVENTION

In an exemplary embodiment, the invention is directed to a communication device that includes a frequency boost module, an antenna element, an electrode element, and a baseband signal processor. The antenna element is coupled to the frequency boost module. The baseband signal processor includes a signal generator, a controller, and a switch element. The signal generator generates an RF (Radio Frequency) signal. The signal generator has a first transmission path, a second transmission path, and a third transmission path. The first transmission path is coupled to the frequency boost module. The third transmission path is coupled to the electrode element. The controller generates a control signal. The switch element selectively couples the second transmission path to the frequency boost module or the electrode element according to the control signal.

In some embodiments, the signal generator supports both the functions of BLE (Bluetooth Low Energy) and HBC (Human Body Communication). The information in a channel map records the channel quality of the BLE and the channel quality of the HBC.

In some embodiments, the electrode element is an HBC electrode touching a human body portion.

In some embodiments, the operational frequency of the RF signal is from 2 MHz to 102 MHz.

In some embodiments, the RF signal includes a first portion, a second portion, and a third portion which are different from each other.

In some embodiments, the first portion of the RF signal falls within a first frequency interval from 2 MHz to 10 MHz, the second portion of the RF signal falls within a second frequency interval from 10 MHz to 80 MHz, and the third portion of the RF signal falls within a third frequency interval from 80 MHz to 102 MHz.

In some embodiments, the first portion of the RF signal is transmitted through the first transmission path, the second portion of the RF signal is transmitted through the second transmission path, and the third portion of the RF signal is transmitted through the third transmission path.

In some embodiments, initially, the second transmission path is coupled to the electrode element.

In some embodiments, the controller generates the control signal according to a feedback signal.

In some embodiments, if the feedback signal indicates that the current communication quality is poor, the controller will control the switch element to couple the second transmission path to the frequency boost module.

In another exemplary embodiment, the invention is directed to a communication method that includes the steps of: generating an RF signal by a signal generator, wherein the signal generator has a first transmission path, a second transmission path, and a third transmission path; coupling the first transmission path to a frequency boost module, wherein an antenna element is coupled to the frequency boost module; generating a control signal by a controller; selectively coupling the second transmission path to the frequency boost module or an electrode element by a switch element according to the control signal; and coupling the third transmission path to the electrode element.

In some embodiments, the communication method further includes: supporting both the functions of BLE and HBC. The information in a channel map records the channel quality of the BLE and the channel quality of the HBC.

In some embodiments, the communication method further includes transmitting the first portion of the RF signal through the first transmission path; transmitting the second portion of the RF signal through the second transmission path; and transmitting the third portion of the RF signal through the third transmission path.

In some embodiments, the communication method further includes: initially, coupling the second transmission path to the electrode element.

In some embodiments, the communication method further includes: generating the control signal by the controller according to a feedback signal.

In some embodiments, the communication method further includes: if the feedback signal indicates that the current communication quality is poor, controlling the switch element to couple the second transmission path to the frequency boost module by the controller.

BRIEF DESCRIPTION OF DRAWINGS

The invention can be more fully understood by reading the subsequent detailed description and examples with references made to the accompanying drawings, wherein:

FIG. 3 is a flowchart of a communication method according to an embodiment of the invention.

DETAILED DESCRIPTION OF THE INVENTION

Figure 1:
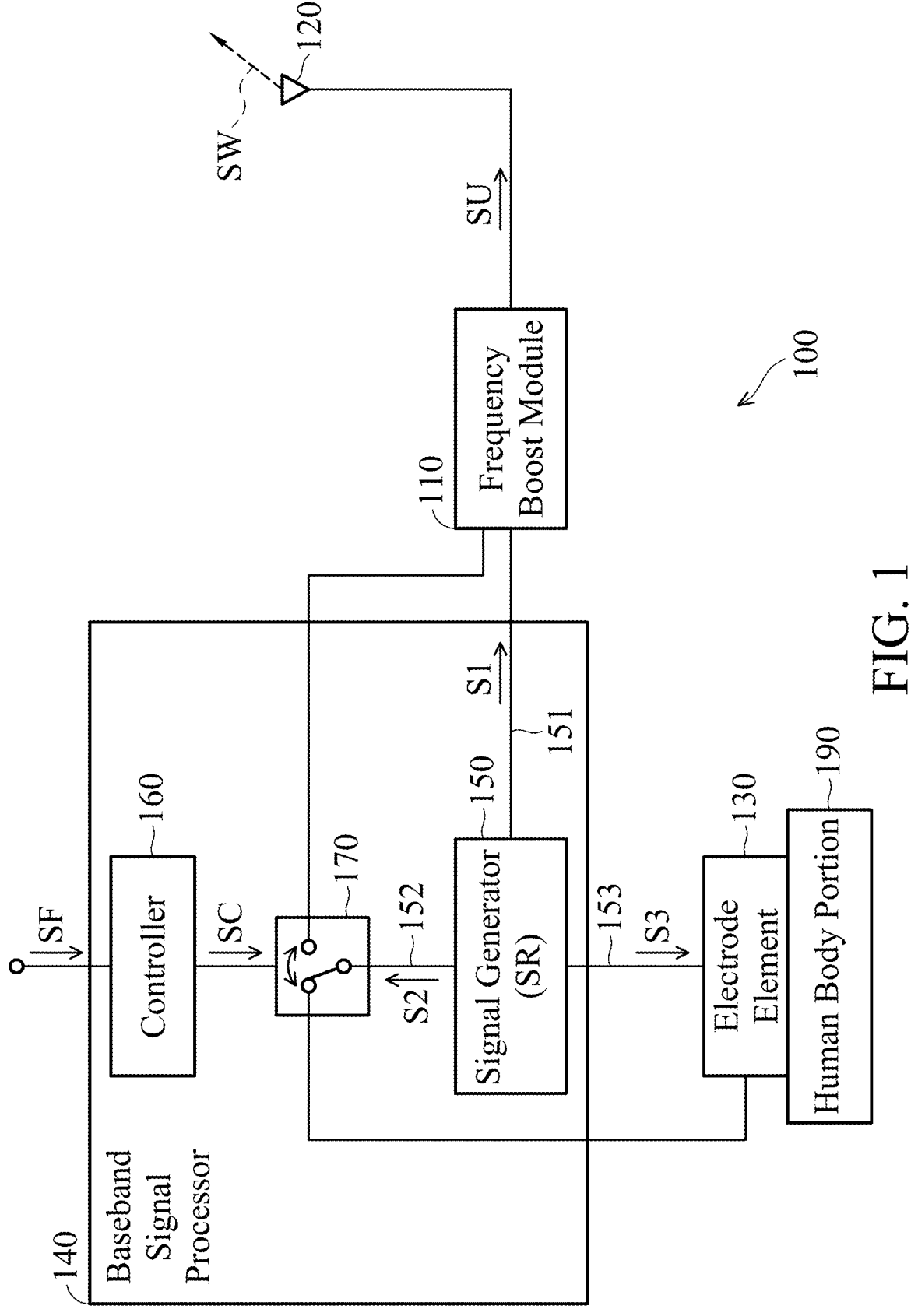
FIG. 1 is a diagram of a communication device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a communication device 100 according to an embodiment of the invention. The communication device 100 may be applied in a mobile device, such as a smart phone, a tablet computer, or a notebook computer, but it is not limited thereto. Alternatively, the communication device 100 may be applied to a relative device of VR (Virtual Reality) or AR (Augmented Reality). In the embodiment of FIG. 1, the communication device 100 includes a frequency boost module 110, an antenna element 120, an electrode element 130, and a baseband signal processor 140. It should be understood that the communication device 100 may further include other components, such as a touch control panel, a battery, a housing, a speaker, and/or a power supply module, although they are not displayed in FIG. 1.

The frequency boost module 110 can be configured to convert its input signal into a frequency boost signal SU. In some embodiments, the frequency boost module 110 includes a mixer and a local oscillator (not shown). For example, the operational frequency of the frequency boost signal SU may be increased by about 2.4 GHz, but it is not limited.

The antenna element 120 is coupled to the frequency boost module 110. The antenna element 120 can convert the frequency boost signal SU into a wireless signal SW. The type of the antenna element 120 is not limited in the invention. For example, the antenna element 120 may be a patch antenna, a monopole antenna, a dipole antenna, a loop antenna, a PIFA (Planar Inverted F Antenna), or a chip antenna.

For example, the electrode element 130 may be an HBC (Human Body Communication) electrode touching a human body portion 190. The human body portion 190 may be any body part of a user, such as a human skin, which may not belong a component relative to the communication device 100.

The baseband signal processor 140 includes a signal generator 150, a controller 160, and a switch element 170. Their practical functions and operations will be introduced over the following embodiments.

The signal generator 150 can be configured to generate an RF (Radio Frequency) signal SR. Specifically, the signal generator 150 has a first transmission path 151, a second transmission path 152, and a third transmission path 153. The first transmission path 151 may be fixedly coupled to the frequency boost module 110. The third transmission path 153 may be fixedly coupled to the electrode element 130. In some embodiments, the first transmission path 151, the second transmission path 152, and the third transmission path 153 mentioned above are considered as different metal pins of the signal generator 150.

On the other hand, the second transmission path 152 of the signal generator 150 is switchable. Specifically, the controller 160 can generate a control signal SC. The switch element 170 can selectively couple the second transmission path 152 to the frequency boost module 110 or the electrode element 130 according to the control signal SC. For example, the switch element 170 may be implemented with an SPDT (Single Pole Double Throw) switch, and it may be switchable between the frequency boost module 110 and the electrode element 130. In some embodiments, if the control signal SC has a high logic level (i.e., a logic "1"), the switch element 170 can couple the second transmission path 152 to the frequency boost module 110; conversely, if the control signal SC has a low logic level (i.e., a logic "0"), the switch element 170 can couple the second transmission path 152 to the electrode element 130, but it is not limited thereto.

Figure 2:
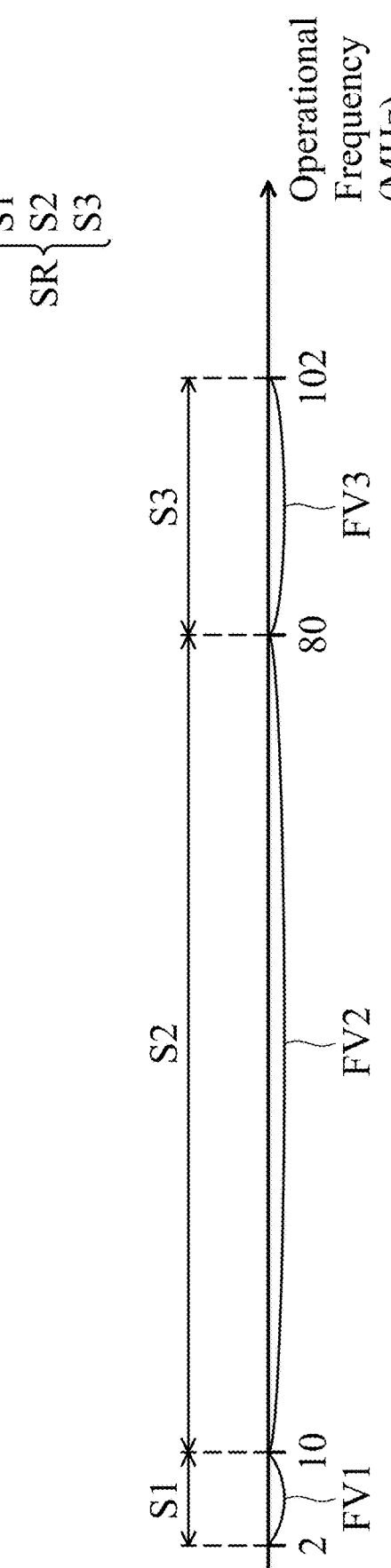
FIG. 2 is a diagram of an RF (Radio Frequency) signal according to an embodiment of the invention.

FIG. 2 is a diagram of the RF signal SR according to an embodiment of the invention. In the embodiment of FIG. 2, the operational frequency of the RF signal SR is from 2 MHz to 102 MHz. Specifically, the RF signal SR includes a first portion S1, a second portion S2, and a third portion S3 which are different from each other. In some embodiments, the first portion S1 of the RF signal SR falls within a first frequency interval FV1 from 2 MHz to 10 MHz, the second portion S2 of the RF signal SR falls within a second frequency interval FV2 from 10 MHz to 80 MHz, and the third portion S3 of the RF signal SR falls within a third frequency interval FV3 from 80 MHz to 102 MHz.

Please refer to FIG. 1 again. In some embodiments, the first portion S1 of the RF signal SR is transmitted through the first transmission path 151, the second portion S2 of the RF signal SR is transmitted through the second transmission path 152, and the third portion S3 of the RF signal SR is transmitted through the third transmission path 153.

For example, the first portion S1 of the RF signal SR is used as a BLE (Bluetooth Low Energy) signal. The BLE signal can be converted into the wireless signal SW, and then can be propagated through air by using the antenna element 120.

For example, the third portion S3 of the RF signal SR is used as an HBC signal. The HBC signal can be propagated through the human body portion 190 by using the electrode element 130.

It should be noted that the second portion S2 of the RF signal SR is used as an overlapping signal between the BLE signal and the HBC signal. It can be propagated with high flexibility. Therefore, the signal generator 150 of the baseband signal processor 140 can support both the functions of BLE and HBC.

In some embodiments, the RF signal SR is divided into a plurality of channels, and the bandwidth of each channel is substantially equal to 2 MHz. In addition, the information in a channel map relative to a Bluetooth system mechanism can record the communication quality of the channels or whether the channels have been used. The information in the channel map may be provided by the signal generator 150. For example, an AFH (Adaptive Frequency Hopping) mechanism may perform a switching process based on the information in the channel map by using the controller 160 and the switch element 170. In some embodiments, the information in the channel map can also record the channel quality of the BLE and the channel quality of the HBC, but it is not limited thereto.

In some embodiments, initially, the second transmission path 152 is coupled to the electrode element 130. The controller 160 can generate the control signal SC according to a feedback signal SF. The feedback signal SF may be an internal signal or an external signal of the communication device 100. If the feedback signal SF indicates that the current communication quality of the communication device 100 is poor, the controller 160 can control the switch element 170 to couple the second transmission path 152 to the frequency boost module 110, instead of the electrode element 130. On the contrary, if the feedback signal SF indicates that the current communication quality of the communication device 100 is good, the controller 160 cannot control the switch element 170 to perform any switching process. For example, the aforementioned communication quality may be determined based on whether the RSSI (Received Signal Strength Indication) of the communication device 100 is greater than a threshold, but it is not limited thereto. With such a design, the second portion S2 of the RF signal SR can be propagated by selectively using either BLE or HBC, so as to maintain the better result of the overall communication quality of the communication device 100.

FIG. 3 is a flowchart of a communication method according to an embodiment of the invention. To begin, in step S310, an RF signal is generated by a signal generator. The signal generator has a first transmission path, a second transmission path, and a third transmission path. In step S320, the first transmission path is coupled to a frequency boost module. An antenna element is coupled to the frequency boost module. In step S330, a control signal is generated by a controller. In step S340, the second transmission path is selectively coupled to the frequency boost module or an electrode element by a switch element according to the control signal. Finally, in step S350, the third transmission path is coupled to the electrode element. It should be understood that these steps are not required to be performed in order, and every feature of the embodiments of FIGS. 1 and 2 may be applied to the communication method of FIG. 3.

The invention proposes a novel communication device and a novel communication method. In comparison to the conventional design, the invention has at least the advantages of improving the overall communication quality, sharing the bandwidth resources, and integrating BLE with HBC. Therefore, the invention is suitable for application in a variety of devices.

Note that the above element parameters are not limitations of the invention. A designer can fine-tune these setting values according to different requirements. It should be understood that the communication device and the communication method of the invention are not limited to the configurations of FIGS. 1-3. The invention may include any one or more features of any one or more embodiments of FIGS. 1-3. In other words, not all of the features displayed in the figures should be implemented in the communication device and the communication method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication device, comprising:
a frequency boost module;
an antenna element, coupled to the frequency boost module;
an electrode element; and
a baseband signal processor, comprising:
a signal generator, generating an RF (Radio Frequency) signal, and having a first transmission path, a second transmission path, and a third transmission path, wherein the first transmission path is coupled to the frequency boost module, and the third transmission path is coupled to the electrode element;
a controller, generating a control signal; and
a switch element, selectively coupling the second transmission path to the frequency boost module or the electrode element according to the control signal.

2. The communication device as claimed in claim 1, wherein the signal generator supports both functions of BLE (Bluetooth Low Energy) and HBC (Human Body Communication), and information in a channel map records channel quality of the BLE and channel quality of the HBC.

3. The communication device as claimed in claim 1, wherein the electrode element is an HBC electrode touching a human body portion.

4. The communication device as claimed in claim 1, wherein an operational frequency of the RF signal is from 2 MHz to 102 MHz.

5. The communication device as claimed in claim 1, wherein the RF signal comprises a first portion, a second portion, and a third portion different from each other.

6. The communication device as claimed in claim 5, wherein the first portion of the RF signal falls within a first frequency interval from 2 MHz to 10 MHz, the second portion of the RF signal falls within a second frequency interval from 10 MHz to 80 MHz, and the third portion of the RF signal falls within a third frequency interval from 80 MHz to 102 MHz.

7. The communication device as claimed in claim 5, wherein the first portion of the RF signal is transmitted through the first transmission path, the second portion of the RF signal is transmitted through the second transmission path, and the third portion of the RF signal is transmitted through the third transmission path.

8. The communication device as claimed in claim 1, wherein initially, the second transmission path is coupled to the electrode element.

9. The communication device as claimed in claim 8, wherein the controller generates the control signal according to a feedback signal.

10. The communication device as claimed in claim 9, wherein if the feedback signal indicates that current communication quality is poor, the controller controls the switch element to couple the second transmission path to the frequency boost module.

11. A communication method, comprising the steps of:
generating an RF signal by a signal generator, wherein the signal generator has a first transmission path, a second transmission path, and a third transmission path;
coupling the first transmission path to a frequency boost module, wherein an antenna element is coupled to the frequency boost module;
generating a control signal by a controller;
selectively coupling the second transmission path to the frequency boost module or an electrode element by a switch element according to the control signal; and
coupling the third transmission path to the electrode element.

12. The communication method as claimed in claim 11, further comprising:

supporting both functions of BLE and HBC by the signal generator, wherein information in a channel map records channel quality of the BLE and channel quality of the HBC.

13. The communication method as claimed in claim 11, wherein the electrode element is an HBC electrode touching a human body portion.

14. The communication method as claimed in claim 11, wherein an operational frequency of the RF signal is from 2 MHz to 102 MHz.

15. The communication method as claimed in claim 11, wherein the RF signal comprises a first portion, a second portion, and a third portion different from each other.

16. The communication method as claimed in claim 15, wherein the first portion of the RF signal falls within a first frequency interval from 2 MHz to 10 MHz, the second portion of the RF signal falls within a second frequency interval from 10 MHz to 80 MHz, and the third portion of the RF signal falls within a third frequency interval from 80 MHz to 102 MHz.

17. The communication method as claimed in claim 15, further comprising:
transmitting the first portion of the RF signal through the first transmission path;
transmitting the second portion of the RF signal through the second transmission path; and
transmitting the third portion of the RF signal through the third transmission path.

18. The communication method as claimed in claim 11, further comprising:
initially, coupling the second transmission path to the electrode element.

19. The communication method as claimed in claim 18, further comprising:
generating the control signal by the controller according to a feedback signal.

20. The communication method as claimed in claim 19, further comprising:
if the feedback signal indicates that current communication quality is poor, controlling the switch element to couple the second transmission path to the frequency boost module by the controller.

* * * * *